United States Patent
Rösch

(10) Patent No.: US 8,297,660 B2
(45) Date of Patent: Oct. 30, 2012

(54) WATER-CONDUCTING HOUSEHOLD APPLIANCE

(75) Inventor: Jürgen Rösch, Nürnberg (DE)

(73) Assignee: Electrolux Home Products Corporation N.V., Zaventem (BE)

( * ) Notice: Subject to any disclaimer, the term of this patent is extended or adjusted under 35 U.S.C. 154(b) by 336 days.

(21) Appl. No.: 12/664,424

(22) PCT Filed: Jul. 7, 2007

(86) PCT No.: PCT/EP2007/006039
§ 371 (c)(1),
(2), (4) Date: Dec. 14, 2009

(87) PCT Pub. No.: WO2009/006917
PCT Pub. Date: Jan. 15, 2009

(65) Prior Publication Data
US 2010/0181757 A1    Jul. 22, 2010

(51) Int. Cl.
*F16L 21/00* (2006.01)
(52) U.S. Cl. .................... 285/236; 285/226; 134/175
(58) Field of Classification Search .................. 285/224, 285/226, 235, 236, 223, 229; 134/172, 183, 134/173, 175
See application file for complete search history.

(56) References Cited

U.S. PATENT DOCUMENTS

| | | | | |
|---|---|---|---|---|
| 2,476,079 A | * | 7/1949 | Benjamin, Jr. | 285/235 |
| 5,547,232 A | * | 8/1996 | Waterman | 285/236 |
| 5,704,656 A | * | 1/1998 | Rowe | 285/236 |
| 6,189,550 B1 | * | 2/2001 | Stickel et al. | 285/235 |
| 6,394,505 B1 | * | 5/2002 | Schmucki et al. | 285/236 |
| 6,578,878 B2 | * | 6/2003 | Berg | 285/226 |
| 6,854,769 B2 | * | 2/2005 | Lutzer | 285/226 |

FOREIGN PATENT DOCUMENTS

| | | |
|---|---|---|
| DE | 78 12 581 U1 | 10/1978 |
| DE | 92 15 365.8 U1 | 4/1994 |
| DE | 197 58 249 A1 | 7/1999 |
| DE | 201 14 394 U1 | 11/2001 |
| DE | 10 2005 047 915 A1 | 4/2007 |
| EP | 1 681 007 A1 | 7/2006 |
| JP | 11 030370 A | 2/1999 |
| WO | WO 01/51841 A | 7/2001 |

OTHER PUBLICATIONS

Office Action for Russian Application No. 2010103980/12 dated Jul. 7, 2007.

* cited by examiner

*Primary Examiner* — David E Bochna
(74) *Attorney, Agent, or Firm* — Alston & Bird LLP

(57) ABSTRACT

Water-conducting household appliance, in particular dishwasher, comprising a circulation pump (3) having a tube-like outlet connector (4) and a subsequent tube (5) connected to the outlet connector (4), wherein a decoupling device (6, 6') for damping vibrations generated by the circulation pump (3) is provided between the outlet connector (4) and the subsequent tube (5).

11 Claims, 2 Drawing Sheets

WATER-CONDUCTING HOUSEHOLD APPLIANCE

FIELD OF THE INVENTION

The invention concerns a water-conducting household appliance, in particular dishwasher, comprising a circulation pump having a tube-like outlet connector and a subsequent tube connected to the outlet connector.

BACKGROUND OF THE INVENTION

Water-conducting household appliances, like dishwashers or washing machines, circulate water, usually for washing purposes, through a wash tub or the like. This water circulation is driven by a circulation pump. The vibrations of such a circulation pump are one of the major causes for noise emissions.

Hence, options to acustically decouple the circulation pump from the rest of the household appliance have been discussed. Advances were made in using mounting devices for the circulation pump including vibration-damping components. As an example, the circulation pump can be mounted using oval rubber elements.

However, another problem concerning the noise emission of water-conducting household appliances is yet unsolved. On the outlet side of the circulation pump, the water has a very high pressure. Thus, no soft tubes can be used because of the danger of rupture. For this reason, known household appliances use a rigid tube directly connected to the outlet connector of the circulation pump. In this manner, vibrations generated by the motor of the circulation pump, which usually have a frequency of about 100 Hz, are transferred to the dishwasher housing via this tube, thus increasing noise.

BRIEF SUMMARY OF THE INVENTION

It is the object of the current invention to provide a water-conducting household appliance having a lower noise emission.

To solve this problem, a household appliance of the initially mentioned type is characterised by a decoupling device for damping vibrations generated by the circulation pump which is provided between the outlet connector and the subsequent tube.

According to the invention, the subsequent tube is not directly connected to the outlet connector of the circulation pump, but by means of the decoupling device. The decoupling device comprises damping elements which reduce or even annihilate the amplitude of the vibrations transmitted to the subsequent tube and therefore to the housing. The subsequent tube is therefore acustically decoupled from the vibrating circulation pump system. In this manner, the low frequency vibrations of the circulation pump do not lead to noise emission which is therefore reduced.

In a preferred embodiment, the decoupling device can comprise at least one sealing element, wherein the sealing element seals a radial distance between the outlet connector or an extension element directly connected to the outlet connector and the subsequent tube or a connecting element directly connected to the subsequent tube. The sealing element is made of an in particular elastic material adapted to dampen the vibrations generated by the circulation pump, so that they are not or only with reduced amplitude transmitted to the subsequent tube. The sealing element therefore serves a double function: it seals the respective connection and dampens the vibrations. The material parameters of the sealing element are to be chosen such that optimal sealing and damping behaviour effects are achieved in the respective configuration.

The decoupling device can also comprise an extension element and/or a connecting element which are discussed in greater detail below.

Preferably, the sealing element can be formed on, in particular extruded onto, the outer surface of the outlet connector or the extension element or the inner surface of the subsequent tube or the connecting element. Techniques for extrusion of certain material, like for example EPDM (Ethylen-Propylen-Dien-Monomer), onto usual tube materials are well known and can advantageously be used in the current invention. During production of the household appliance, in this case, the outlet connector or the extension element is inserted into the subsequent tube or the connecting element, thereby creating a sealing but vibration damping connection between the two elements. The sealing element or the sealing elements according to the invention can have various shapes, however, in an advantageous embodiment, at least one, preferably three sealing lips are provided as sealing elements.

To be able to dampen the vibrations, which usually have a frequency of about 100 Hz, the sealing element can have a Shore hardness of 60 or smaller. Suitable materials for the sealing element include elastic synthetic materials or rubber. Preferably, the sealing element is made of EPDM.

As already mentioned, the decoupling device can also comprise a rigid extension element directly connected to the outlet connector, on which the sealing element is formed, in particular extruded, and to which the subsequent tube or connection element is directly connected via the sealing element. Such an extension element is in particular useful if the outlet connector is particularly short. It should be made of a rigid material because of the high pressure of the water outlet by the circulation pump. Using an elastic material would lead to an expansion of the diameter of the extension tube and bears the risk of rupture. The extension element can in particular be a tube itself.

In an alternative embodiment, the sealing element can also be formed on, in particular extruded onto, the outlet connector itself. In this case, no additional extension element is needed.

If the position of the circulation pump and in particular the subsequent tube is not totally fixed, the use of only the sealing element bears the risk of the subsequent tube being pushed away from the circulation pump. If both the circulation pump and the subsequent tube are already fixedly mounted in the household appliance, this risk is eliminated. However, usually this is not the case. Thus, in an embodiment of the invention, a mounting device for the subsequent tube is provided close to the circulation pump. In this manner, no relative movement of the subsequent tube with respect to the circulation pump can occur.

However, in a preferred embodiment, the decoupling device comprises a connection element formed as the pump-side end of the subsequent tube or connected directly to the subsequent tube, wherein the connection element has a radially extended section arranged between the sealing element and a fixation device for mounting the connection element to the outlet connector, wherein the extended section comprises a wall section for damping vibrations generated by the circulation pump in the radial direction. In the two alternatives described in this invention, the pump-side end of the subsequent tube itself can be formed as the connection element or the connection element can be a separate part directly connected to the subsequent tube. By providing the wall section in the radial direction which is formed to dampen vibration generated by the circulation pump, the vibrations also cannot be transmitted via the connection element. The connection element is especially advantageous in that it serves multiple functions. First of all, the connection element is mounted to the outlet connector or the circulation pump itself, acting as a fixation device for the subsequent tube. This means, the subsequent tube cannot be pushed away from the outlet connector due to the high pressure at the outlet side of the circulation pump. Secondly, the connecting element covers the sealing element as well as the surrounding area where the tubes or elements are joined. Thus, it acts as a protection device. It has to be noted at this point that independent of the presence of a connection element, it can still be the subsequent tube being directly connected to the outlet connector or the extension element via the sealing element if the connecting element extends over the subsequent tube where it is fixed to the subsequent tube using a mounting device like a clamp. In a third function, the connection element prevents leakage of water leaked through the sealing element into the household appliance. Because of the sealing element, the chamber between the outlet connector and/or the extension element and the wall of the connection element is free from water. This not only allows the use of an elastic material or an elastic shape to dampen the vibrations in the wall section, but also creates a room where water leaking through the sealing element can be collected and therefore does not instantly flood the household appliance. Of course, this is only an emergency fallback solution, as normally the chamber should be kept free from water to protect the elastic wall section damping the vibrations.

The wall section can for example be made of a different material, especially an elastic and/or soft material, inserted into the connection element. However, in a preferred embodiment, the wall section has consecutive elastic folds in a radial direction. The connection element comprises soft folds which are suitably soft/elastic to decouple the unwanted vibration of the circulation pump from the subsequent tube. Since, as has already been described, the chamber enclosed between the connection element and the outlet connector and/or the extension element is kept free from water, the increased water pressure generated by the circulation pump cannot reach the soft folds so that the soft folds do not become hardened and rigid.

BRIEF DESCRIPTION OF THE DRAWINGS

Further advantages and details of the current invention can be learnt from the following description of preferred embodiments in connection with the drawings, wherein.

DETAILED DESCRIPTION OF THE INVENTION

Figure 1:
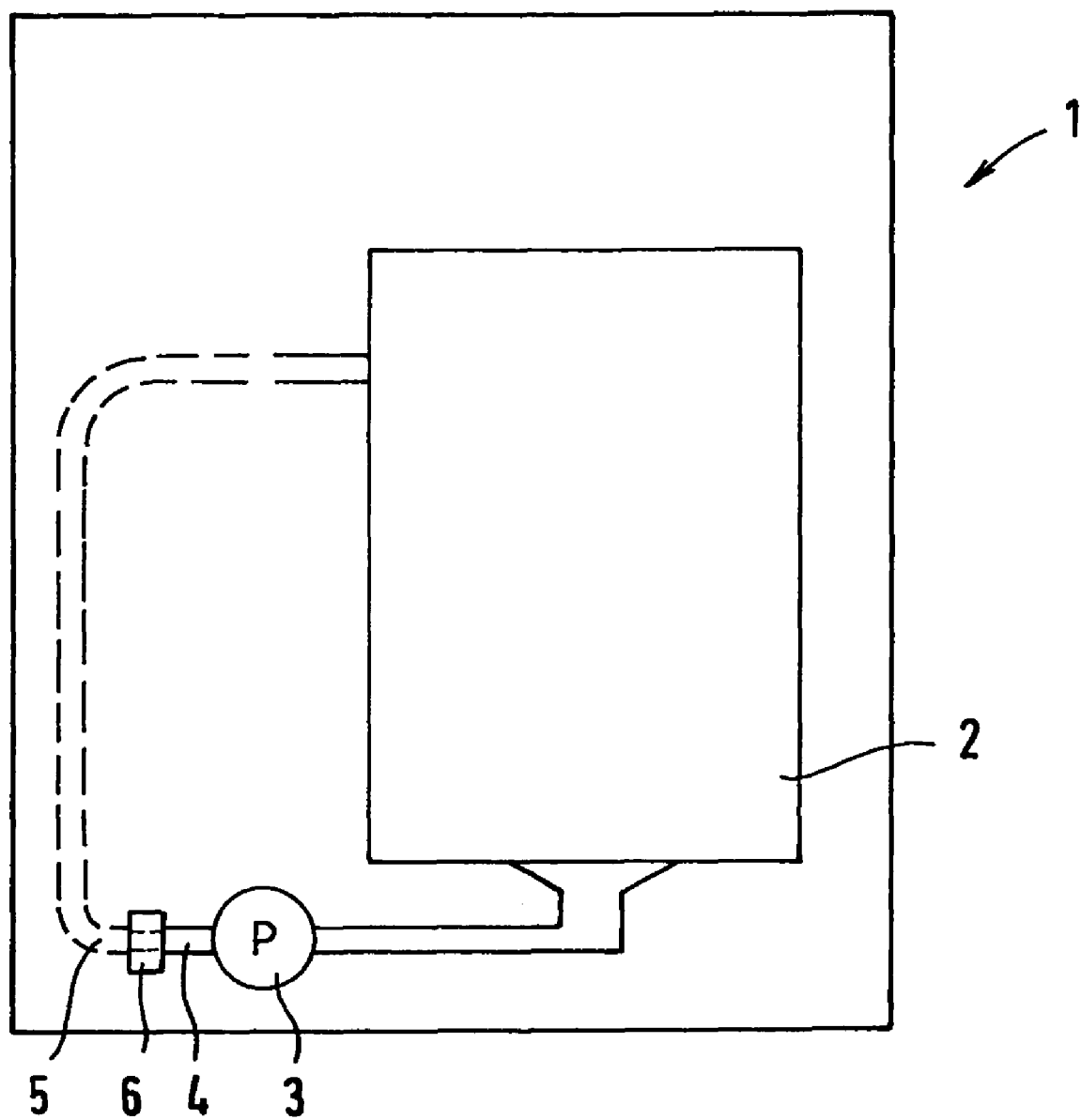
FIG. 1 is a schematic view of a household appliance according to the invention.

FIG. 1 schematically shows a household appliance 1 according to the invention, in this case a dishwasher. It comprises a tub 2 wherethrough water is circulated. To facilitate the water circulation, the household appliance 1 comprises a circulation pump 3 having a tube-like outlet connector 4 connected to a subsequent pipe 5 conducting the water back to the tub 2.

To decrease noise emission from the household appliance 1, the circulation pump 3 is mounted in a manner such that vibrations generated by the circulation pump 3 are not transmitted to the housing of the household appliance 1. The decoupling mounting of the circulation pump 3 is well known in the art and not discussed in detail here. However, due to the high pressure at the outlet side of the circulation pump 3, a rigid subsequent tube 5 has to be used. As can be shown, the subsequent tube 5 also transmits vibrations of the circulation pump 3 to the household appliance housing in known household appliances. Thus, the household appliance 1 according to the invention further comprises a decoupling device 6 provided between the outlet connector 4 and the subsequent tube 5 and only shown schematically in FIG. 1.

Figure 2:
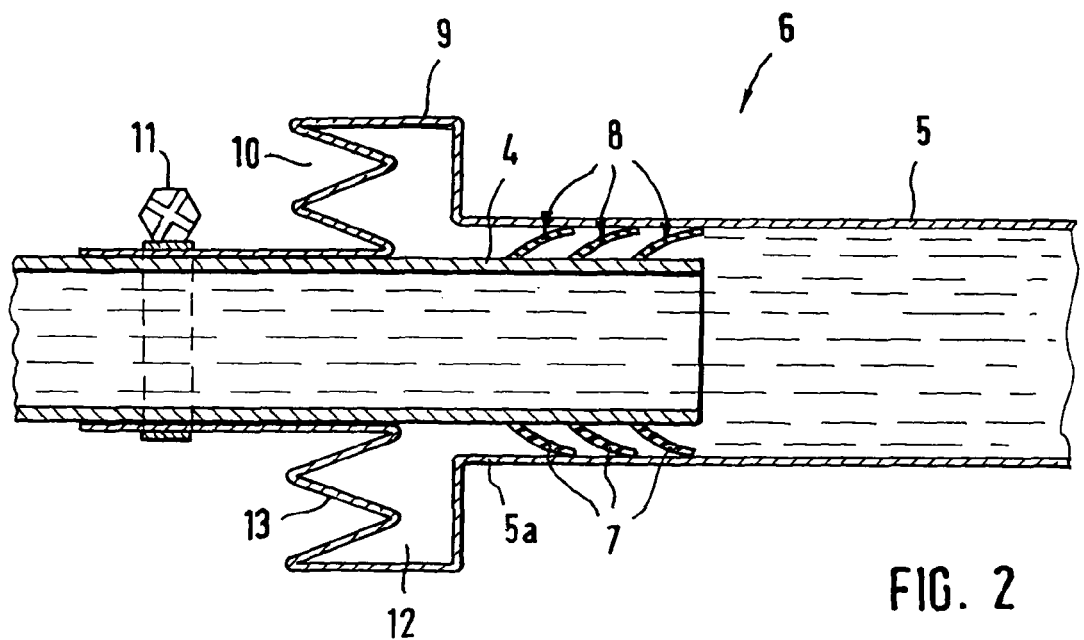
FIG. 2 a detail of the household appliance showing a first embodiment of the invention.
Figure 3:
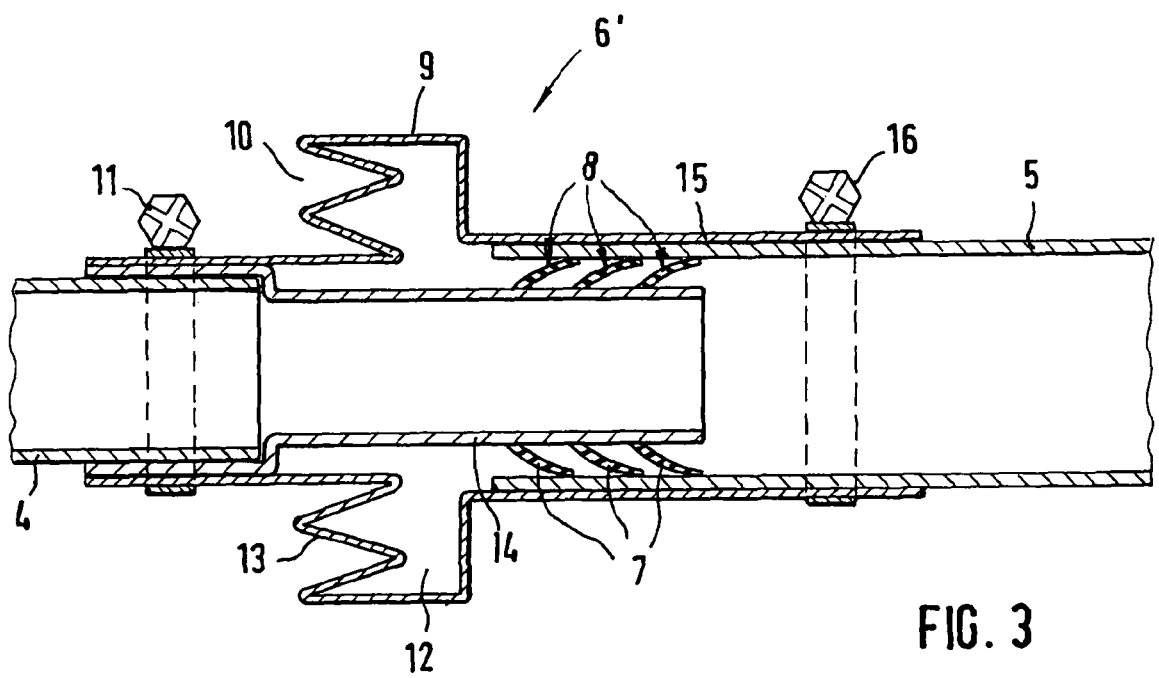
FIG. 3 is a detail of the household appliance showing a second embodiment of the invention.

FIGS. 2 and 3 show in detail different embodiments of the decoupling device 6.

FIG. 2 shows a first embodiment of the decoupling device 6 dampening the transmission of vibrations generated by the circulation pump 3, that is, vibrations of the outlet connector 4, to the subsequent tube 5.

The decoupling device 6 comprises three sealing elements 7 formed as sealing lips 8 extruded onto the outer surface of the outlet connector 4. During the assembly of the household appliance 1, the subsequent tube 5 is pushed over the outlet connector 4 which is therewith inserted into the subsequent tube 5. The sealing elements 7, which are made of elastic EPDM and have a Shore hardness of 60 or smaller sealingly contact the inner surface of the subsequent tube 5. Thus, water can flow from the outlet connector 4 to the subsequent tube 5 without leakage. Additionally, as the sealing elements 7 are made of a suitably elastic and soft material, vibrations of the outlet connector 4 are not transmitted or at least efficiently damped to the subsequent tube 5 and therewith the housing of the household appliance 1. In this manner, noise emission is reduced.

As can also be seen from FIG. 2, the pump-side end of the subsequent tube 5 is formed to create a connection element 5a having a radially extended section 9 comprising a wall section 10 for damping vibrations of the outlet connector 4 in the radial direction. The connection element 5a is fixated to the outlet connector 4 by a clamp 11. Hence, relative movement of the subsequent tube 5 to the outlet connector 4 is prevented and the subsequent tube 5, though rigid, cannot be pushed away from the outlet connector 4. The wall section 10 comprises a plurality of folds 13 so that it is elastic in a radial direction and therefore adapted to prevent transmission of vibrations generated by the circulation pump 3 to the subsequent tube 5 or at least dampen these vibrations. Vibrations are therefore damped by the sealing elements 7 and the wall section 10 so that the overall noise emission is reduced. The connection element 5a is also made from EPDM, but as the chamber 12 defined between the connecting element 5a and the outlet connector 4 of the circulation pump 3 is free from water, there is no risk of the folds 11 getting rigid and losing their elasticity. Nevertheless, in an emergency case when water leaks through the sealing elements 7, water is collected in the chamber 12 and does not leak into the household appliance 1 itself.

FIG. 3 shows a second embodiment of a decoupling device 6', wherein like components are designated by like numerals. Again, a decoupling device 6' comprises three sealing lips 8 as sealing elements 7. Deviating from the embodiment of FIG. 2, they are extruded onto a tube-like extension element 14 into which the outlet connector 4 is inserted. The extension element 14 is fixated to the outlet connector 4 by the same clamp 11 by which the connection element 15, in this case provided as a separate part, is mounted fixedly to the outlet connector 4. On the subsequent tube-side a second clamp 16 is provided to fixate the connecting element 15 to the subsequent tube 5. In this manner, the subsequent tube 5 and the outlet connector 4 themselves need not be changed to realise the invention.

The functionality of the decoupling device 6' is the same as in FIG. 2, as the connecting element 15 again comprises the extended section 9 with the wall section 10 having consecutive folds 13 to dampen vibrations in a radial direction.

The extension element 14 is formed as a rigid tube, therefore, if exposed to the high pressure of the water, it does not expand and therefore cannot contact the connecting element 15. This prevents the forming of an additional path for the transmission of vibrations.

It should be noted that additional embodiments lie within the scope of the current invention. For example, the sealing elements may also be formed on the inner surface of the connection element or the subsequent tube. Instead of folds, another material having elastic and soft properties can be inserted as the wall section. Also, embodiments can be considered wherein the sealing elements 7 sealingly connect the connection element to the extension element or the output connector.

Additionally or as an alternative to the connection element, a mounting device for the subsequent tube can be provided close to the circulation pump preventing a relative movement of the subsequent tube with respect to the outlet connector in a longitudinal direction.

The invention claimed is:

1. A water-conducting household appliance comprising:
   a circulation pump having a tube-like outlet connector and a subsequent tube connected to the outlet connector; and
   a decoupling device for damping vibrations generated by the circulation pump, the decoupling device being provided between the outlet connector and the subsequent tube,
   wherein the decoupling device comprises at least one sealing element made of a material adapted to dampen the vibrations generated by the circulation pump, wherein the sealing element seals a radial distance between the outlet connector or an extension element directly connected to the outlet connector and the subsequent tube or a connection element directly connected to the subsequent tube, and
   wherein the sealing element is formed on or extruded onto the outer surface of the outlet connector or the extension element or the inner surface of the subsequent tube or the connection element.

2. The household appliance according to claim 1, wherein at least one sealing lip is provided as the sealing element.

3. The household appliance according to claim 1, wherein the sealing element has a Shore hardness of 60 or smaller.

4. The household appliance according to claim 1, wherein the sealing element is made of elastic synthetic material or rubber.

5. The household appliance according to claim 1, wherein the decoupling device comprises a rigid extension element directly connected to the outlet connector, on which the sealing element is formed or extruded, and to which the subsequent tube or connection element is connected directly via the sealing element.

6. The household appliance according to claim 1, wherein the sealing element is formed on or extruded onto the outlet connector.

7. The household appliance according to claim 1, wherein a mounting device for the subsequent tube is provided proximate to the circulation pump.

8. The household appliance according to claim 1, wherein the decoupling device comprises a connection element formed as the pump-side end of the subsequent tube or as a separate connection element connected directly to the subsequent tube, wherein the connection element has a radially extended section arranged between the sealing element and a fixation device for mounting the connection element to the outlet connector, wherein the extended section comprises a wall section for damping vibrations generated by the circulation pump in the radial direction.

9. The household appliance according to claim 8, wherein the wall section has consecutive elastic folds in a radial direction.

10. A water-conducting household appliance comprising:
    a circulation pump having a tube-like outlet connector and a subsequent tube connected to the outlet connector; and
    a decoupling device for damping vibrations generated by the circulation pump, the decoupling device being provided between the outlet connector and the subsequent tube,
    wherein the decoupling device comprises at least one sealing element made of a material adapted to dampen the vibrations generated by the circulation pump and further comprises a rigid extension element directly connected to the outlet connector,
    wherein the sealing element seals a radial distance between the rigid extension element and the subsequent tube or a connection element directly connected to the subsequent tube, and
    wherein the sealing element is formed on or extruded onto the rigid extension element.

11. A water-conducting household appliance comprising:
    a circulation pump having a tube-like outlet connector and a subsequent tube connected to the outlet connector; and
    a decoupling device for damping vibrations generated by the circulation pump, the decoupling device being provided between the outlet connector and the subsequent tube,
    wherein the decoupling device comprises at least one sealing element made of a material adapted to dampen the vibrations generated by the circulation pump, wherein the sealing element seals a radial distance between the outlet connector or an extension element directly connected to the outlet connector and the subsequent tube or a connection element directly connected to the subsequent tube, and
    wherein the sealing element is formed on or extruded onto the outlet connector.

* * * * *